United States Patent
Hsu et al.

(10) Patent No.: US 9,977,552 B2
(45) Date of Patent: May 22, 2018

(54) TOUCH CONTROL DEVICE

(71) Applicant: HON HAI PRECISION INDUSTRY CO., LTD., New Taipei (TW)

(72) Inventors: Yao-Pin Hsu, Hsinchu (TW); Chia-Yi Tsai, New Taipei (TW); Li-Chiao Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 344 days.

(21) Appl. No.: 14/834,619

(22) Filed: Aug. 25, 2015

(65) Prior Publication Data

US 2016/0349874 A1   Dec. 1, 2016

(30) Foreign Application Priority Data

May 28, 2015  (TW) .............................. 104117249 A

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04112* (2013.01)

(58) Field of Classification Search
None
See application file for complete search history.

(56) References Cited

U.S. PATENT DOCUMENTS

| 2006/0038792 | A1* | 2/2006 | Sano | ..................... | G06F 3/0436 345/173 |
| 2011/0018557 | A1* | 1/2011 | Badaye | ................... | G06F 3/044 324/658 |
| 2013/0016363 | A1* | 1/2013 | Iwamoto | ................. | G06F 3/044 356/616 |
| 2013/0044074 | A1* | 2/2013 | Park | ..................... | G02F 1/13338 345/174 |
| 2013/0307793 | A1* | 11/2013 | Song | ....................... | G06F 3/044 345/173 |
| 2014/0152613 | A1* | 6/2014 | Ishizaki | ............... | G06F 3/0412 345/174 |
| 2014/0168540 | A1* | 6/2014 | Wang | .................... | G06F 3/0412 349/12 |
| 2014/0204290 | A1* | 7/2014 | Chen | ...................... | G06F 3/044 349/12 |
| 2014/0327845 | A1* | 11/2014 | Yashiro | .................. | G06F 3/044 349/12 |

(Continued)

FOREIGN PATENT DOCUMENTS

JP   2011-221842 A   11/2011
JP   2012-053644 A   3/2012

(Continued)

*Primary Examiner* — Jennifer Mehmood
*Assistant Examiner* — Carl Adams
(74) *Attorney, Agent, or Firm* — ScienBiziP, P.C.

(57) ABSTRACT

A touch control device includes a touch control circuitry and a plurality of touch control electrodes electrically coupling with the touch control circuitry. Each touch control electrode includes a plurality of micro electrodes. Each micro electrode has a first length along a first direction and a second length along a second direction which is perpendicular to the first direction. Both the first and second lengths are equal to or smaller than 80 micrometer and equal to or larger than 50 micrometers.

18 Claims, 18 Drawing Sheets

(56) References Cited

U.S. PATENT DOCUMENTS

| | | | |
|---|---|---|---|
| 2015/0169116 A1* | 6/2015 | Masuda | G06F 3/044 345/174 |
| 2015/0293624 A1* | 10/2015 | Chen | G06F 3/044 345/174 |
| 2015/0363031 A1* | 12/2015 | Chang | G06F 3/044 345/173 |

FOREIGN PATENT DOCUMENTS

| | | |
|---|---|---|
| JP | 2013-105255 A | 5/2013 |
| JP | 2014-85771 A | 5/2014 |
| JP | 2014-199605 A | 10/2014 |
| TW | 201351248 A | 12/2013 |
| TW | M480724 U | 6/2014 |
| TW | 20143545 A | 9/2014 |
| TW | M487479 U | 10/2014 |
| TW | 201447704 A | 12/2014 |
| TW | 201510834 A | 3/2015 |
| WO | 2014/133347 A1 | 9/2014 |

\* cited by examiner

TOUCH CONTROL DEVICE

CROSS-REFERENCE TO RELATED APPLICATIONS

This application claims priority to Taiwanese Patent Application No. 104117249 filed on May 28, 2015, the contents of which are incorporated by reference herein.

FIELD

The subject matter herein generally relates to a touch control device, and particularly to electrode arrangement of the touch control device.

BACKGROUND

A touch control device includes a plurality of touch control electrodes. A pattern or contour of the touch control electrodes, if visible, adversely affects the visual effect of the touch control device. A user may be visually comprehensive of the pattern or contour of the touch control electrodes when the touch control electrodes generate moiré patterns, which causes the touch control device to have an inferior visual effect. The inferior visual effect can result in an unpleasant experience of the user during use of the touch control device. The moiré effect can be more serious, when the touch control device is combined with a display panel.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
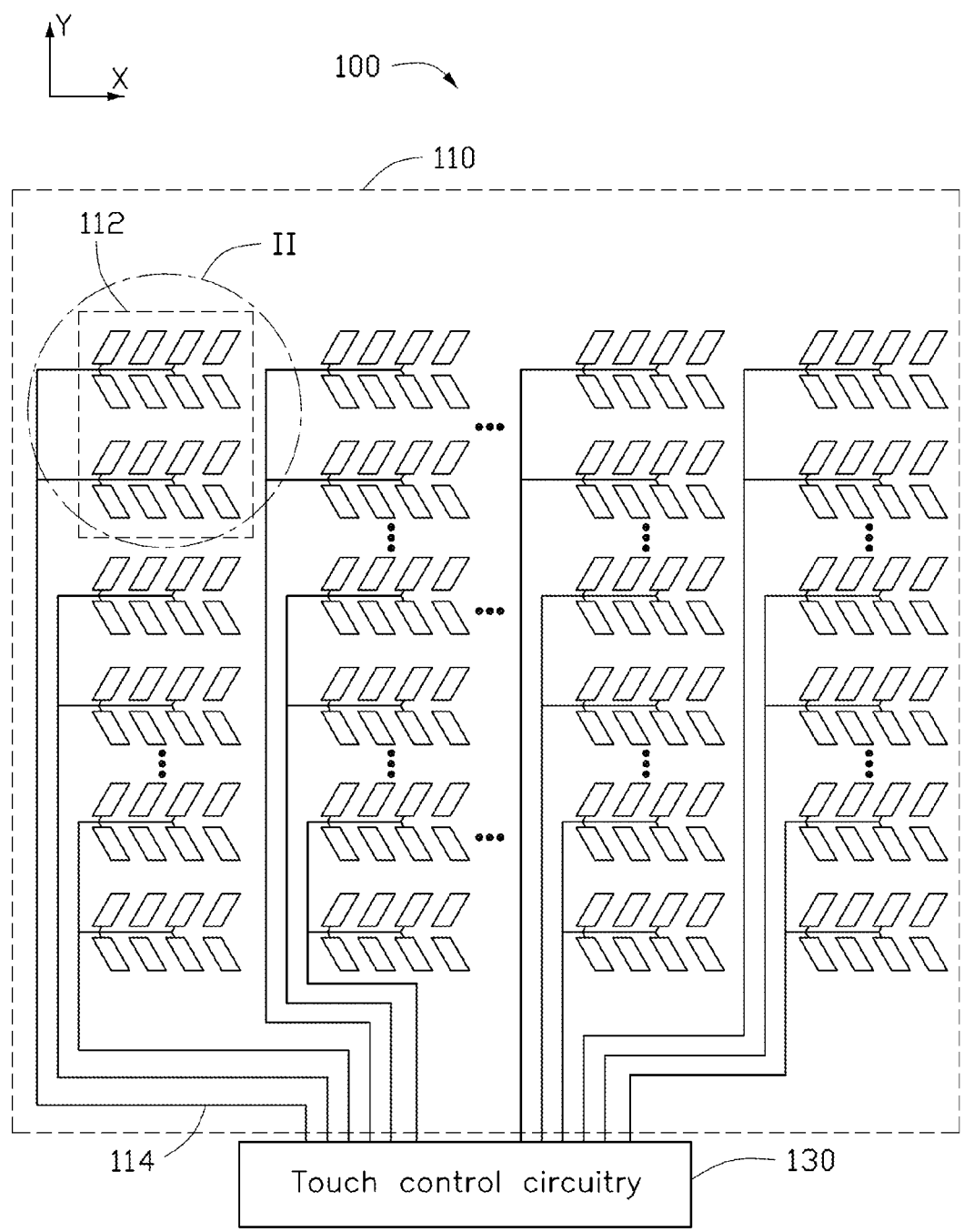
FIG. 1 is a diagrammatic view of a touch control device in accordance with a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a touch control device which can sense pressure thereon to have an electronic device having the touch control device to perform different operations or instructions.

FIG. 1 illustrates a diagrammatic view of a touch control device 100 in accordance with a first embodiment of the present disclosure. The touch control device 100 includes a touch control region 110 and a touch control circuitry 130 electrically coupling with the touch control region 110. The touch control region 110 includes a plurality touch control electrodes 112 and a plurality of electrically conductive lines 114. Each touch control electrode 112 is electrically coupled to the touch control circuitry 130 via a corresponding electrically conductive line 114. In accordance with this embodiment, the touch control electrodes 112 are arranged in an array to form a single-layered, capacitive touch control device.

Figure 2:
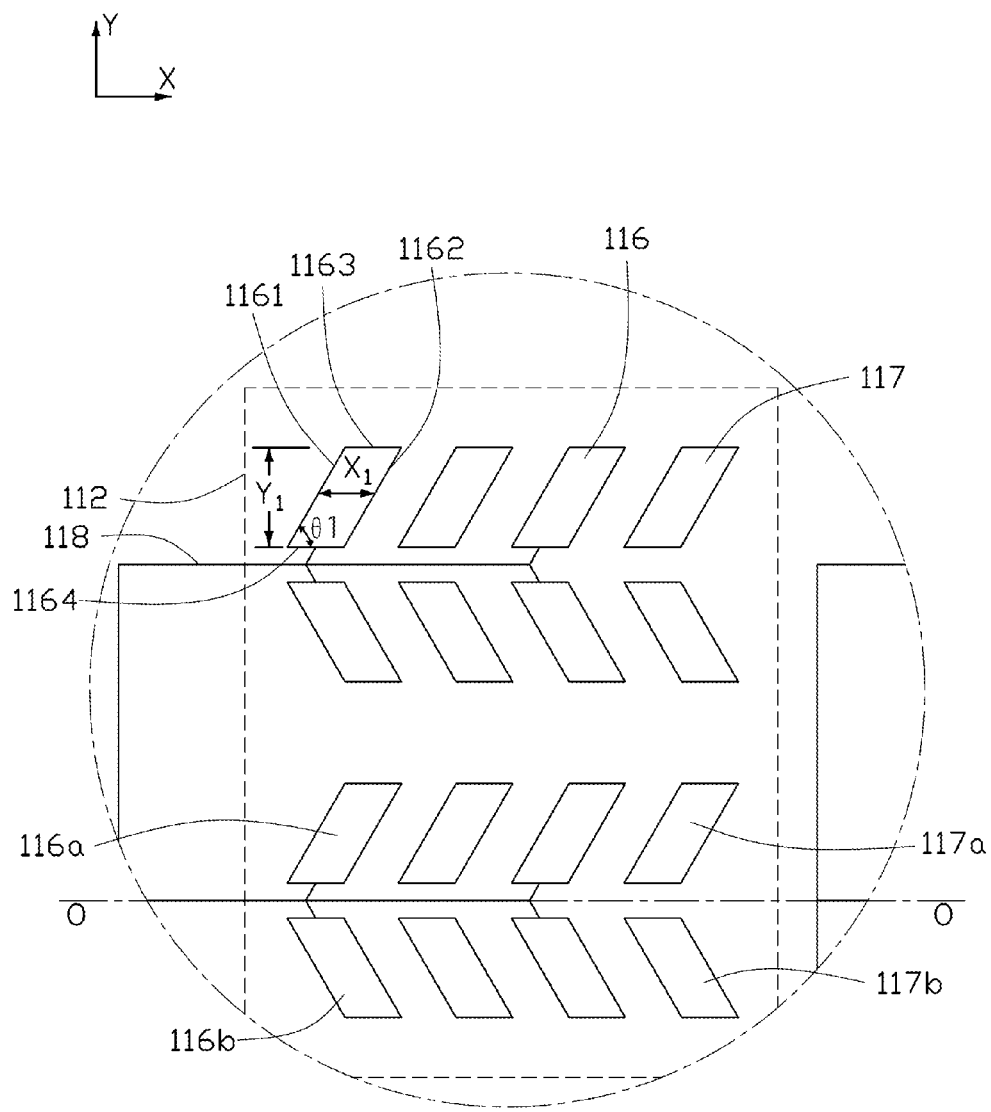
FIG. 2 is an enlarged view of a circled part II of FIG. 1.

Referring to FIG. 2, which shows, in large scale, details of the touch control electrodes 112 of the touch control device 100 of FIG. 1. Each touch control electrode 112 includes a plurality of micro electrodes 116 and a plurality of coupling lines 118. The micro electrodes 116 are electrically coupled together by the coupling lines 118. Each micro electrode 116 has a first length X1 along a first direction X, and a second length Y1 along a second direction Y which is perpendicular to the first direction X. The first length X1 is the maximum length of each micro electrode 116 along the first direction X, while the second length Y1 is the maximum length of each micro electrode 116 along the second direction Y. Both the first and second lengths X1, Y1 are equal to or less than 80 micrometer and equal to or larger than 50 micrometer.

Each micro electrode 116 includes parallel first and second sides 1161, 1162, a third side 1163 interconnecting two ends of the first and second sides 1161, 1162 and a fourth side 1164 interconnecting the other two ends of the first and second sides 1161, 1162. An angle θ1 is defined between the first side 1161 and the first direction X, wherein the angle θ1 is smaller than 90 degree. In at least one embodiment, the angle θ1 is between 30 and 60 degrees. For example, the angle θ1 is 45 degrees. The third and fourth sides 1163, 1164 are also parallel to each other whereby the micro electrode 116 has a shape of a parallelogram. The third and fourth sides 1163, 1164 extend along the first direction X. The first length X1 is a length of the third side 1163 or the fourth side 1164, while the second length Y1 is a distance between the third and fourth sides 1163, 1164, which is equal to a height of the parallelogram.

The plurality of micro electrodes 116 are divided into first micro electrodes 116a and second micro electrodes 116b, which are symmetrically arranged at two sides of a first axis O-O which is extended along the first direction X.

Each touch control electrode 112 further includes dummy electrodes 117 each located between two neighboring micro electrodes 116 along the first direction X. The dummy electrodes 117 are electrically insulated from the micro electrodes 116 and the coupling lines 118. Each dummy electrode 117 has a shape and dimension the same as a shape and dimension of a neighboring micro electrode 116 along the first direction X. The micro electrodes 116 and dummy electrodes 117 of each touch control electrode are arranged in an array, wherein the dummy electrodes 117 can be interposed between the micro electrodes 116. It can be understood that the dummy electrodes 117 can be omitted. The dummy electrodes 117 are divided into first dummy electrodes 117a and second dummy electrodes 117b. The first and second dummy electrodes 117a, 117b are symmetrically arranged at the two sides of the first axis O-O. Although in the shown embodiment, each touch control electrode 112 includes eight micro electrodes 116 and eight dummy electrodes 117, it can be understood that the number is not fixed, but can be varied to thereby adjust sensibility of the touch control electrode 112 in accordance with the actual requirement.

The micro electrodes 116 and the dummy electrodes 117 can be made of transparent, electrically conductive material such as indium tin oxide (ITO) or indium zinc oxide (IZO). The micro electrodes 116 and the dummy electrodes 117 can be made of the same material and formed at the same time. The coupling lines 118 can also be made of transparent, electrically conductive material such as ITO or IZO. A width of each coupling line 118 is smaller than the first length X1 and the second length Y1. The coupling lines 118 can be formed at the same time when the micro and dummy electrodes 116, 117 are formed. It can be also understood that the coupling lines 118 can be made of other material such silver paste including nano silver particles.

According to the present disclosure, each micro electrode 116 has the first length X1 and second length Y1 no larger than 80 micrometers, whereby each micro electrode 116 is too small to be seen by a user of the touch control device 100. Therefore, the user will not see the pattern or contour of the touch control electrodes 116. Accordingly, the visual effect and user's experience in using the touch control device 100 by the user can be improved.

Figure 3:
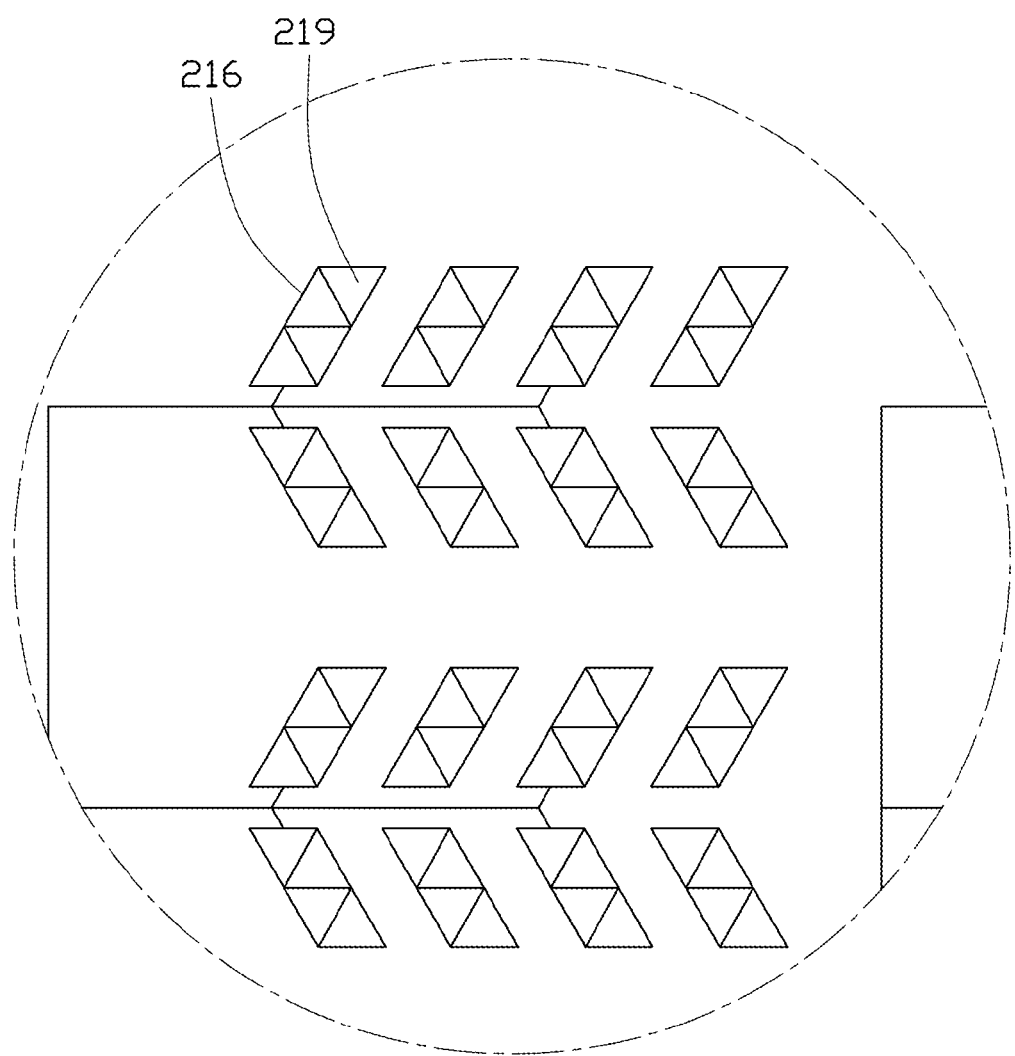
FIG. 3 is a view similar to FIG. 2, but illustrating a touch control device in accordance with a second embodiment of the preset disclosure.

Referring to FIG. 3, touch control electrodes of a touch control device in accordance with a second embodiment are shown, which are substantially similar to the first embodiment. The difference is that a micro electrode 216 of the second embodiment consists of four substantially triangular sub-micro electrodes 219. The triangular sub-micro electrodes 219 are combined together to form the micro electrode 216 having the shape of a parallelogram. Since each sub-micro electrode 219 has a further reduced dimension, the visual effect of the touch control device having the micro electrodes 216 in accordance with the second embodiment can be further improved.

Figure 4:
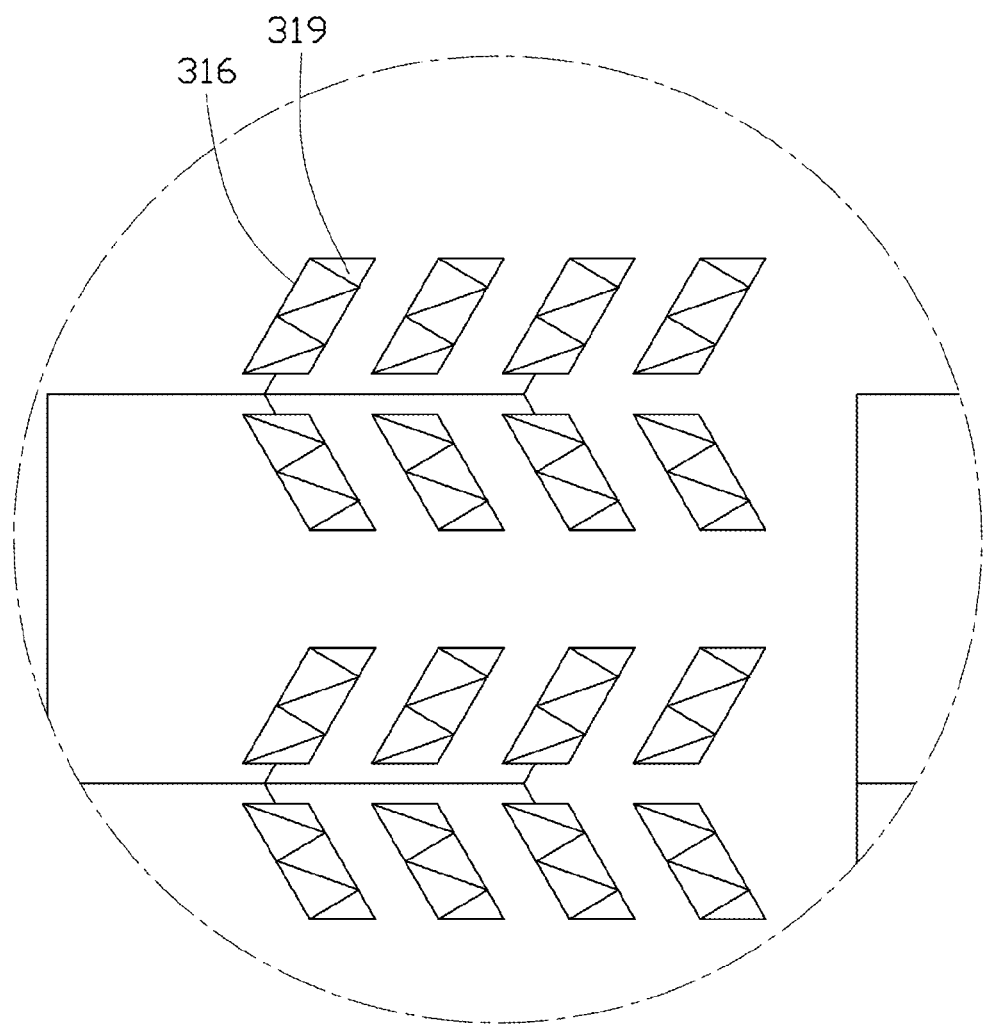
FIG. 4 is a view similar to FIG. 2, but illustrating a touch control device in accordance with a third embodiment of the preset disclosure.

Referring to FIG. 4, a third embodiment of touch control electrodes of the present disclosure is substantially the same as the second embodiment. The difference is that five substantially triangular sub-micro electrodes 319 constitute a micro electrode 316.

Figure 5:
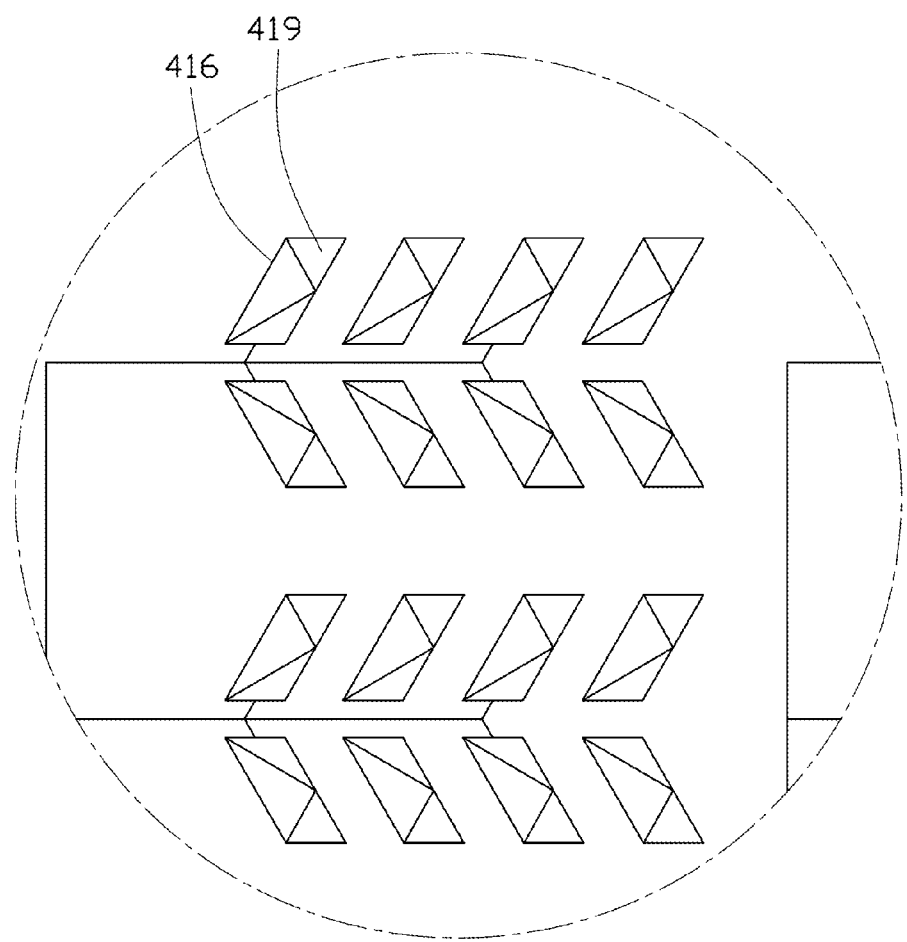
FIG. 5 is a view similar to FIG. 2, but illustrating a touch control device in accordance with a fourth embodiment of the preset disclosure.

Referring to FIG. 5, a fourth embodiment of touch control electrodes of the present disclosure is substantially the same as the second embodiment. The difference is that three substantially triangular sub-micro electrodes 419 constitute a micro electrode 416.

Figure 6:
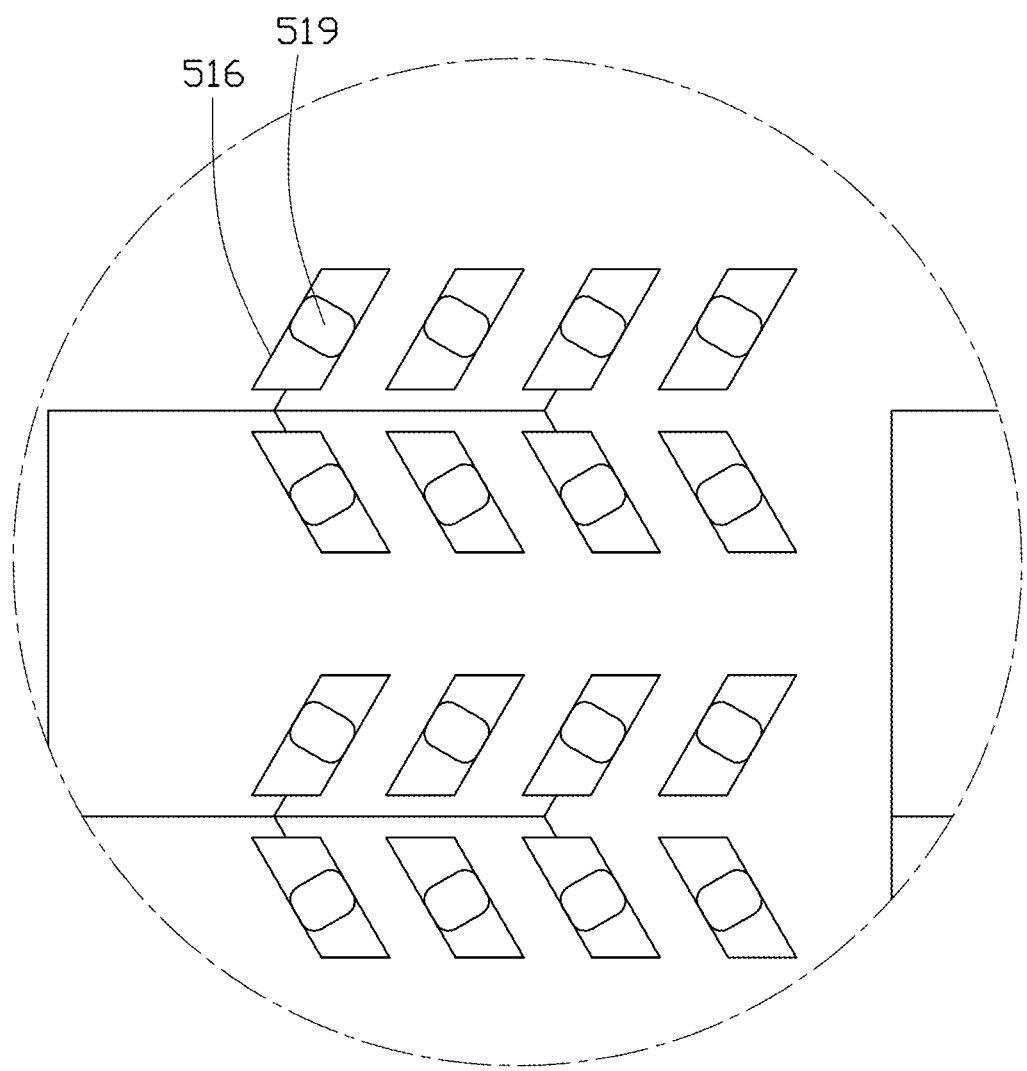
FIG. 6 is a view similar to FIG. 2, but illustrating a touch control device in accordance with a fifth embodiment of the preset disclosure.

Referring to FIG. 6, touch control electrodes of a touch control device in accordance with a fifth embodiment are shown, which are substantially similar to the first embodiment. The difference is that a micro electrode 516 of the fifth embodiment further defines an opening 519 therein. The opening 519 is located substantially at a center of the micro electrode 516 and is substantially rectangular with rounded corners. It can be understood that the opening 519 can be round, elliptical, square, triangular or other shape. The opening 519 can reduce the real estate occupied by the micro electrode 516 to further reduce the visual effect of the touch control electrodes.

Figure 7:
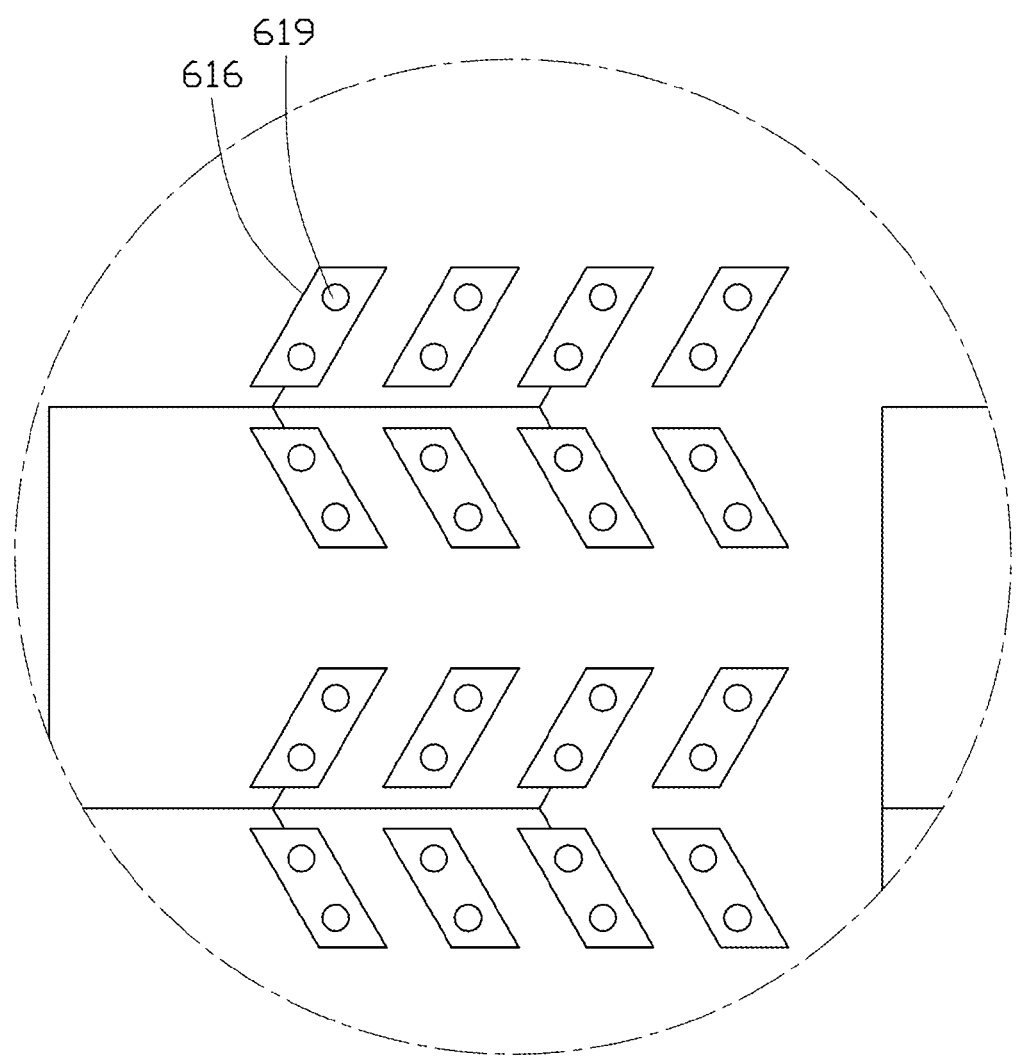
FIG. 7 is a view similar to FIG. 2, but illustrating a touch control device in accordance with a sixth embodiment of the preset disclosure.

Referring to FIG. 7, a sixth embodiment of touch control electrodes of the present disclosure is substantially the same as the fifth embodiment. The difference is that two round openings 619 are defined in each micro electrode 616. The two round openings 619 are arranged along a lengthwise direction of the micro electrode 616.

Figure 8:
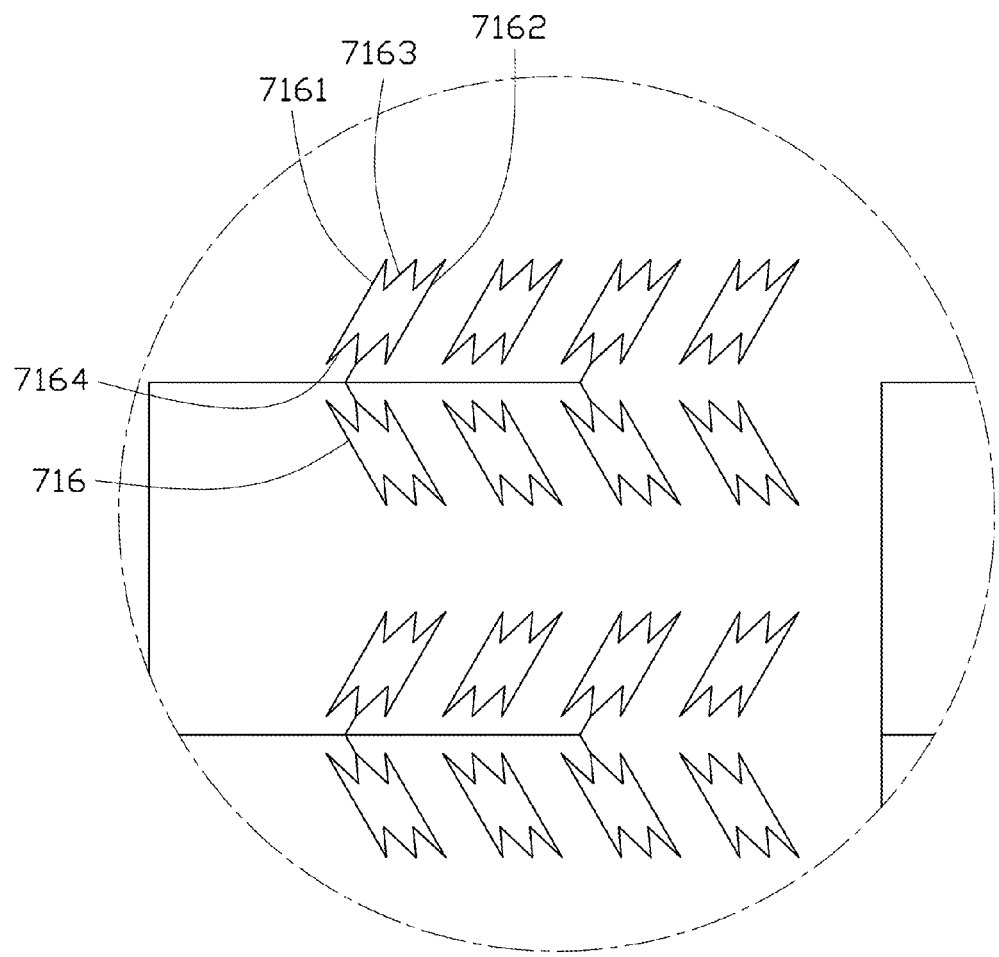
FIG. 8 is a view similar to FIG. 2, but illustrating a touch control device in accordance with a seventh embodiment of the preset disclosure.

Referring to FIG. 8, touch control electrodes of a touch control device in accordance with a seventh embodiment are shown, which are substantially similar to the first embodiment. A micro electrode 716 of the seventh embodiment is also substantially parallelogram-shaped, having first, second, third and fourth sides 7161, 7162, 7163, 7164. In accordance with this embodiment, the third and fourth sides 7163, 7164 are not smooth, but serrated.

Figure 9:
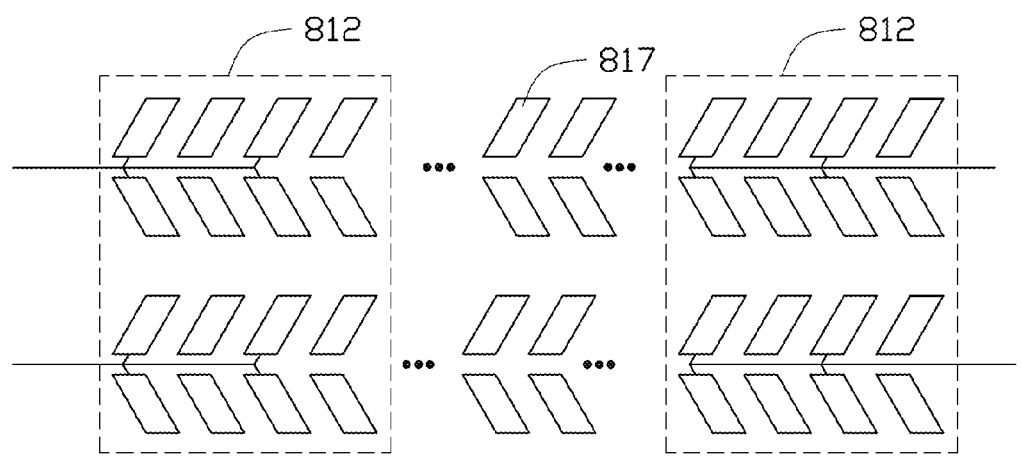
FIG. 9 is a diagrammatic view of a part of a touch control device in accordance with an eighth embodiment of the preset disclosure.

FIG. 9 illustrates touch control electrodes of a touch control device in accordance with an eighth embodiment. The touch control electrodes are substantially similar to the first embodiment. The difference is that a plurality of dummy electrodes 817 is disposed between two neighboring touch control electrodes 812 along the first direction X. Since the interspace between the two touch control electrodes is filled with the dummy electrodes 817, the pattern and the contour of the touch control electrode 812 will not be easily visually comprehended to thereby improve the user's visual effect and experience of use for the touch control device.

Figure 10:
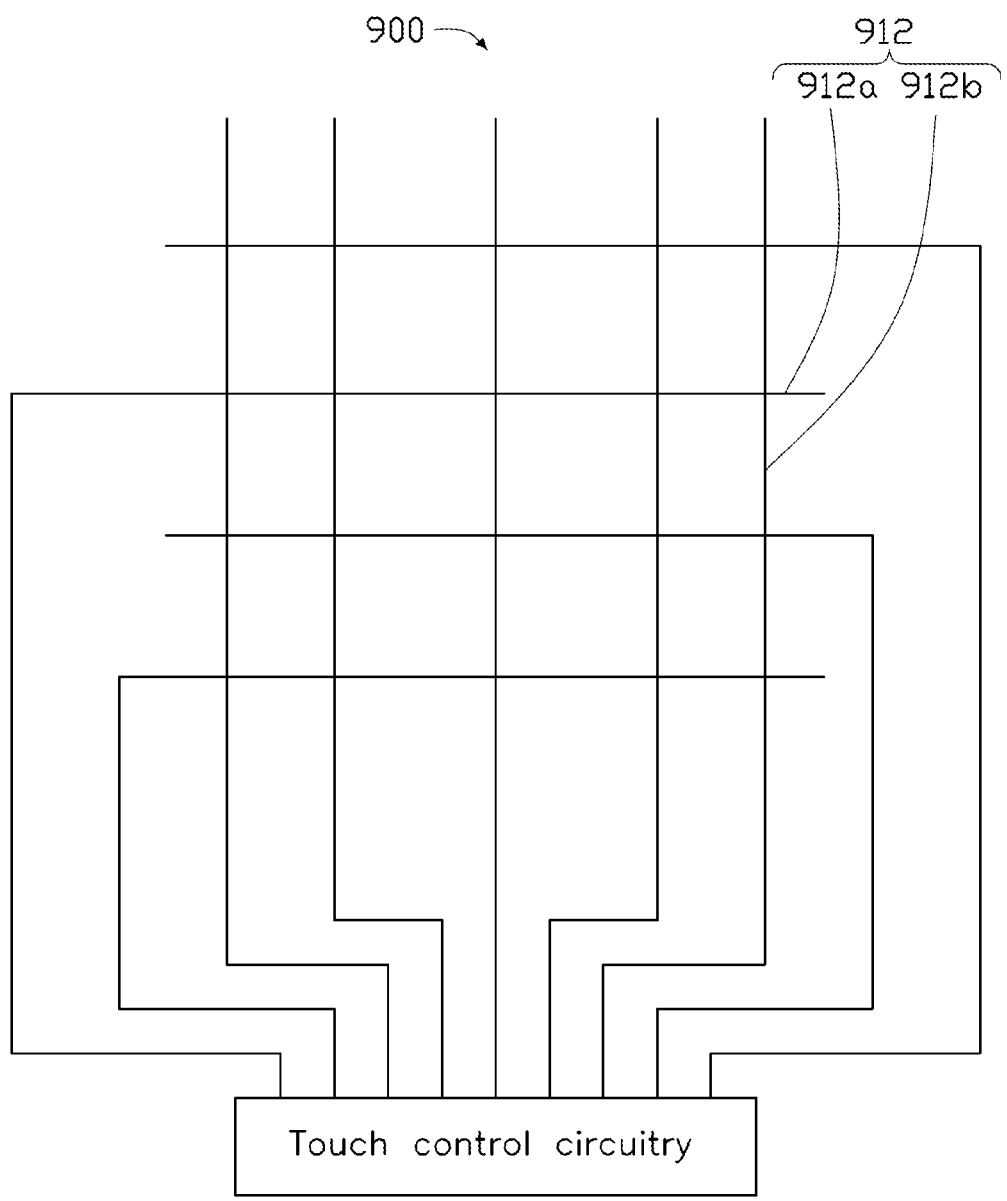
FIG. 10 is a diagram of an equivalent circuit of a touch control device in accordance with a ninth embodiment of the present disclosure.

FIG. 10 illustrates an equivalent circuit of a touch control device 900 in accordance with a ninth embodiment. The touch control device 900 includes a plurality of touch control electrodes 912. The plurality of touch control electrodes 912 form a plurality of first touch control conductive lines 912a extending along a third direction X2 and a plurality of second touch control conductive lines 912b extending along a fourth direction Y2. The fourth direction Y2 is perpendicular to the third direction X2. The second touch control conductive lines 912b perpendicularly intersect and are electrically insulating from the first touch control conductive lines 912a.

Figure 11:
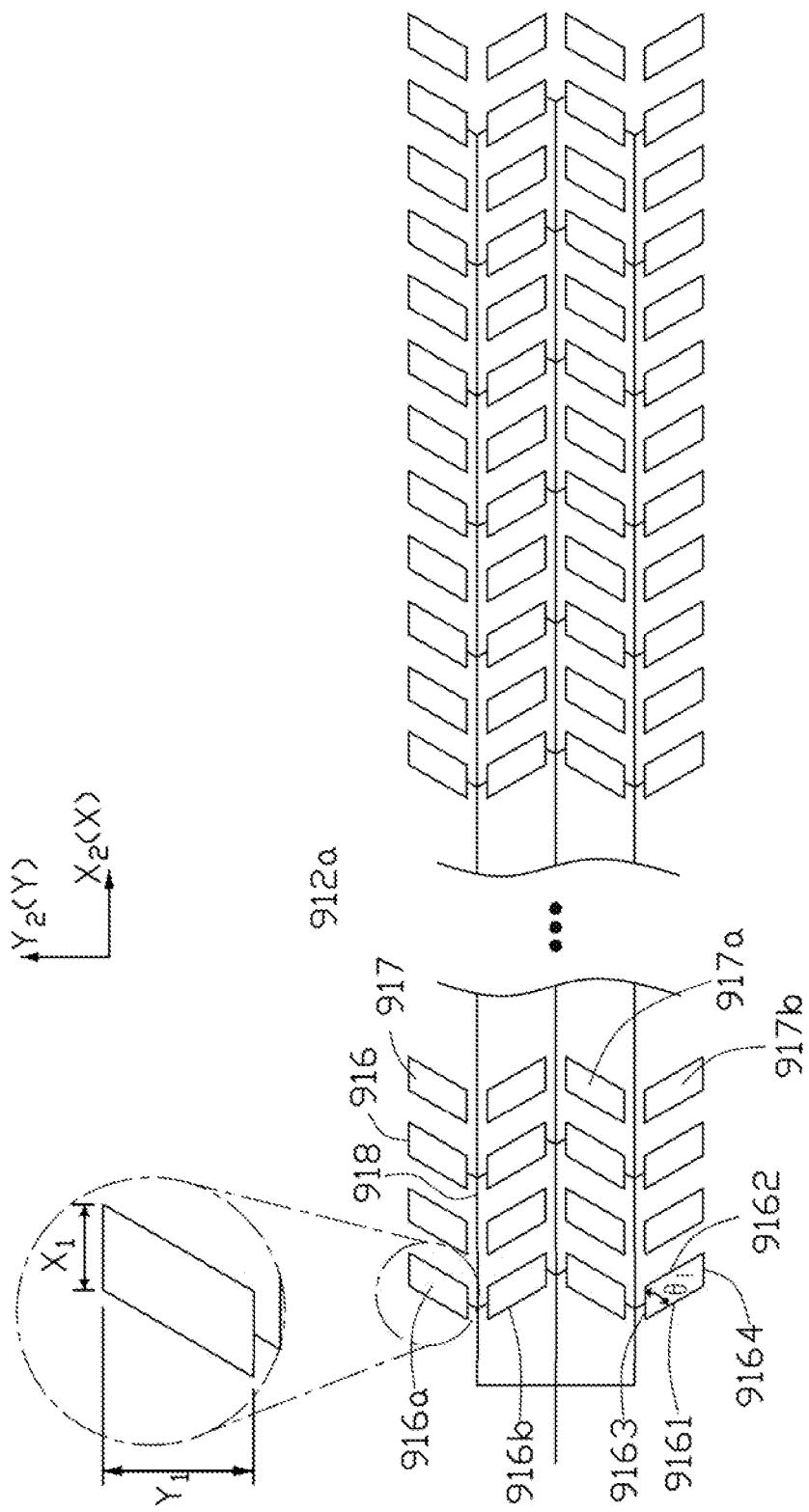
FIG. 11 is a diagrammatic view, with a part being enlarged, of a first touch control conductive line of the touch control device of FIG. 10.

FIG. 11 illustrates detailed structure of the first touch control conductive line 912a of the touch control device 900 of FIG. 10. Similar to the touch control electrodes 112 of the first embodiment, the first touch control conductive line 912a includes a plurality of micro electrodes 916 and a plurality of coupling lines 918 electrically coupling the micro electrodes 916 together. Each micro electrode 916 has a first length X1 along the third direction X2, and a second length Y1 along the fourth direction Y2 which is perpendicular to the third direction X2. The first length X1 is the maximum length of each micro electrode 916 along the third direction X2, while the second length Y1 is the maximum length of each micro electrode 916 along the fourth direction Y2. Both the first and second lengths X1, Y1 are equal to or less than 80 micrometers and equal to or larger than 50 micrometers. In this embodiment, the third direction X2 is the same as the first direction X, while the fourth direction Y2 is the same as the second direction Y.

Each micro electrode 916 includes parallel first and second sides 9161, 9162, a third side 9163 interconnecting two ends of the first and second sides 9161, 9162 and a fourth side 9164 interconnecting the other two ends of the first and second sides 9161, 9162. An angle θ1 is defined between the first side 9161 and the third direction X2, wherein the angle θ1 is smaller than 90 degrees. In at least one embodiment, the angle θ1 is between 30 and 60 degrees. For example, the angle θ1 is 45 degrees. The third and fourth sides 9163, 9164 are also parallel to each other whereby the micro electrode 916 has a shape of a parallelogram. The third and fourth sides 9163, 9164 extend along the third direction X2. The first length X1 is a length of the third side 9163 or the fourth side 9164, while the second length Y1 is a distance between the third and fourth sides 9163, 9164, which is equal to a height of the parallelogram.

The plurality of micro electrodes 916 are divided into first micro electrodes 916a and second micro electrodes 916b, which are symmetrically arranged at two sides of an axis which is extended along the third direction X2 and located between the first and second micro electrodes 916a, 916b.

Each touch control electrode 912 further includes dummy electrodes 917 each located between two neighboring micro electrodes 916 along the third direction X2. The dummy electrodes 917 are electrically insulated from the micro electrodes 916 and the coupling lines 918. Each dummy electrode 917 has a shape and dimension the same as a shape and dimension of a neighboring micro electrode 916 along the third direction X2. The micro electrodes 916 and dummy electrodes 917 of each touch control electrode 912 are arranged in an array, wherein the dummy electrodes 917 can be interposed between the micro electrodes 916. It can be understood that the dummy electrodes 917 can be omitted. The dummy electrodes 917 are divided into first dummy electrodes 917a and second dummy electrodes 917b. The first and second dummy electrodes 917a, 917b are symmetrically arranged at the two sides of the axis extending along the third direction X2.

The micro electrodes 916 and the dummy electrodes 917 can be made of transparent, electrically conductive material such as indium tin oxide (ITO) or indium zinc oxide (IZO). The micro electrodes 916 and the dummy electrodes 917 can be made of the same material and formed at the same time. The coupling lines 918 can also be made of transparent, electrically conductive material such as ITO or IZO. A width of each coupling line 918 is smaller than the first length X1 and the second length Y1. The coupling lines 918 can be formed at the same time when the micro and dummy electrodes 916, 917 are formed. It can be also understood that the coupling lines 918 can be made of other material such as silver paste including nano silver particles to increase the electrical conductivity of the coupling lines 918. In this case, the micro and dummy electrodes 916, 917 and the coupling lines 918 are formed at different times.

Figure 12:
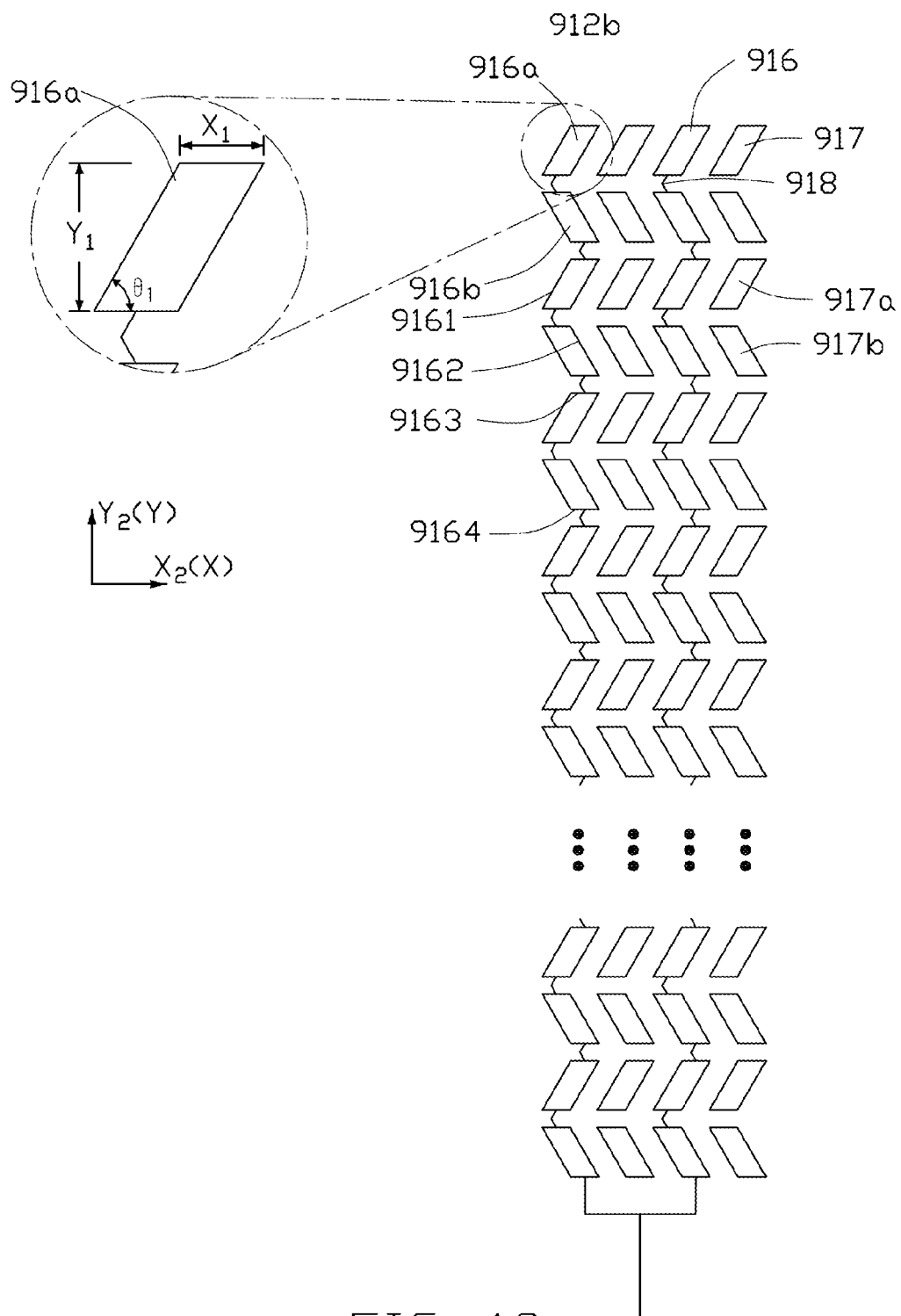
FIG. 12 is a diagrammatic view, with a part being enlarged, of a second touch control conductive line of the touch control device of FIG. 10.

FIG. 12 illustrates detailed structure of the second touch control conductive line 912b of the touch control device 900 of FIG. 10. Similar to the structure of the touch control electrodes 112 of the first embodiment, the second touch control conductive lines 912b each include a plurality of micro electrodes 916 and a plurality of coupling lines 918 electrically coupling the micro electrodes 916 together. Each micro electrode 916 has a first length X1 along the third direction X2, and a second length Y1 along the fourth direction Y2 which is perpendicular to the third direction X2. The first length X1 is the maximum length of each micro electrode 916 along the third direction X2, while the second length Y1 is the maximum length of each micro electrode 916 along the fourth direction Y2. Both the first and second lengths X1, Y1 are equal to or less than 80 micrometers and equal to or larger than 50 micrometers. As illustrated, the third direction X2 is the same as the first direction X, while the fourth direction Y2 is the same as the second direction Y.

Each micro electrode 916 includes parallel first and second sides 9161, 9162, a third side 9163 interconnecting two ends of the first and second sides 9161, 9162 and a fourth side 9164 interconnecting the other two ends of the first and second sides 9161, 9162. An angle θ1 is defined between the first side 9161 and the third direction X2, wherein the angle θ1 is smaller than 90 degrees. In at least one embodiment, the angle θ1 is between 30 and 60 degrees. For example, the angle θ1 is 45 degrees. The third and fourth sides 9163, 9164 are also parallel to each other whereby the micro electrode 916 has a shape of a parallelogram. The third and fourth sides 9163, 9164 extend along the third direction X2. The first length X1 is a length of the third side 9163 or the fourth side 9164, while the second length Y1 is a distance between the third and fourth sides 9163, 9164, which is equal to a height of the parallelogram.

The plurality of micro electrodes 916 are divided into first micro electrodes 916a and second micro electrodes 916b, which are symmetrically arranged at two sides of an axis which is extended along the third direction X2 and located between the first and second micro electrodes 916a, 916b.

Each touch control electrode 912 further includes dummy electrodes 917 each located between two neighboring micro electrodes 916 along the third direction X2. The dummy electrodes 917 are electrically insulated from the micro electrodes 916 and the coupling lines 918. Each dummy electrode 917 has a shape and dimension the same as a shape and dimension of a neighboring micro electrode 916 along the third direction X2. The micro electrodes 916 and dummy electrodes 917 of each touch control electrode 912 are arranged in an array, wherein the dummy electrodes 917 can be interposed between the micro electrodes 916. It can be understood that the dummy electrodes 917 can be omitted. The dummy electrodes 917 are divided into first dummy electrodes 917a and second dummy electrodes 917b. The first and second dummy electrodes 917a, 917b are symmetrically arranged at the two sides of the axis extending along the third direction X2.

The micro electrodes 916 and the dummy electrodes 917 can be made of transparent, electrically conductive material such as indium tin oxide ("ITO") or indium zinc oxide ("IZO"). The micro electrodes 916 and the dummy electrodes 917 can be made of the same material and formed at the same time. The coupling lines 918 can also be made of transparent, electrically conductive material such as ITO or IZO. A width of each coupling line 918 is smaller than the first length X1 and the second length Y1. The coupling lines 918 can be formed at the same time when the micro and dummy electrodes 916, 917 are formed. It can be also understood that the coupling lines 918 can be made of other material such as silver paste including nano silver particles.

According to this embodiment, the micro electrodes 916 of the first touch control conductive lines 912a overlap the dummy electrodes 917 of the second touch control conductive lines 912b at places where the first touch control conductive lines 912a intersect the second touch control conductive lines 912b. By such arrangement, interferences between the touch control conductive lines 912a, 912b can be reduced to increase the reliability and accuracy of detection of the touch control performed to the touch control device 900.

Figure 13:
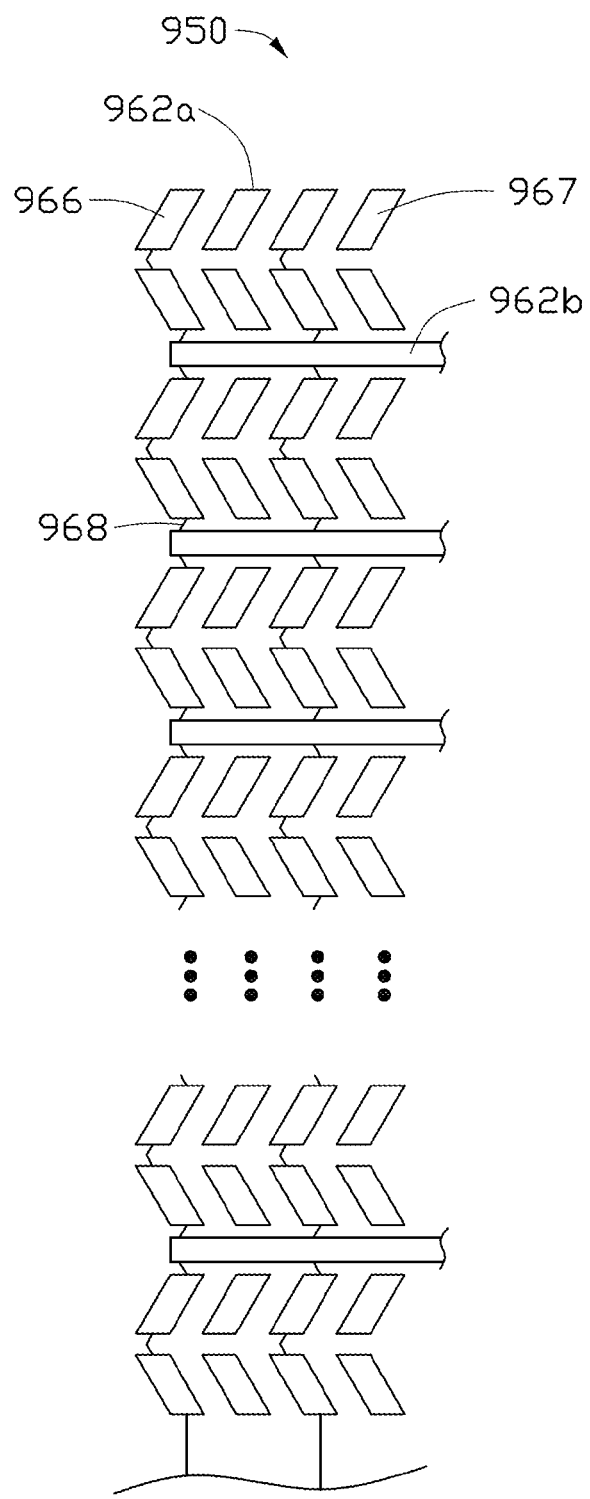
FIG. 13 is a diagrammatic view of a part of a touch control device in accordance with a tenth embodiment of the present disclosure.

FIG. 13 illustrates a diagram showing a part of a structure of a touch control device 950 in accordance with a tenth embodiment of the present disclosure. The touch control device 950 is substantially the same as the touch control device 900 of the ninth embodiment, except a structure of second touch control conductive lines 962b of the touch control device 950. The second touch control conductive lines 962b each are a simple linear stripe, without the micro electrodes, the coupling lines and the dummy electrodes of the touch control device 900 of the ninth embodiment. The second touch control conductive lines 962b intersect the first touch control conductive lines 962a at the coupling lines 968 of the first touch control conductive line 962a, whereby the second touch control conductive lines 972b do not overlap the micro electrodes 966 and the dummy electrodes 967 of the first touch control conductive lines 962a.

Figure 14:
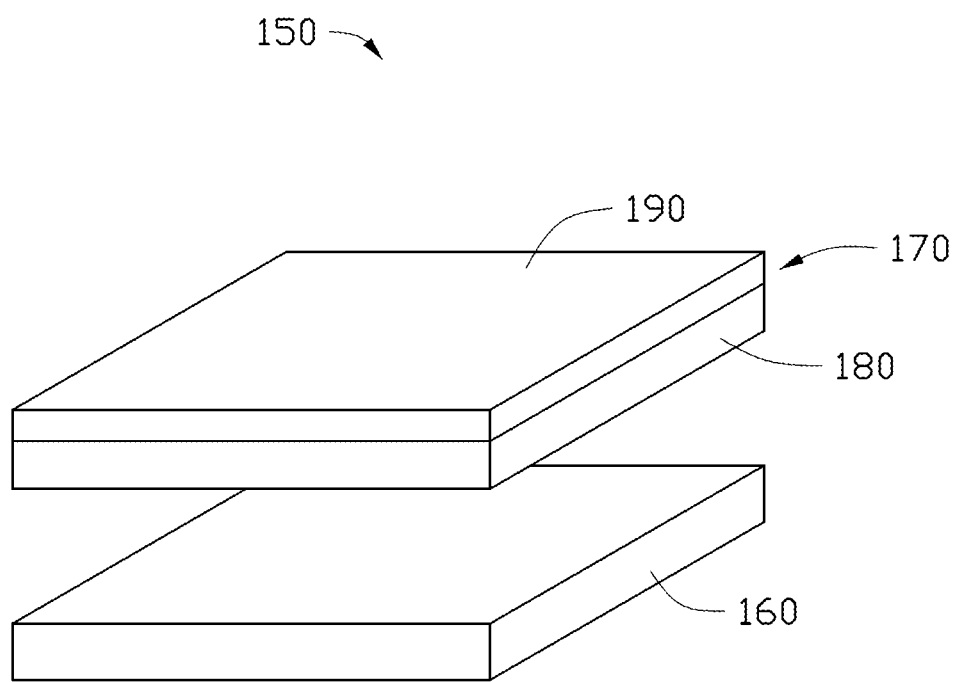
FIG. 14 is an exploded, isometric view of a touch control device in accordance with an eleventh embodiment of the present disclosure.

FIG. 14 illustrates an isometric view of a structure of a touch control device 150 in accordance with an eleventh embodiment of the present disclosure. The touch control device 150 includes a display panel 160 and a touch control structure 170 over the display panel 160. The touch control structure 170 includes a substrate 180 and a touch control electrode layer 190 over the substrate 180. The touch control electrode layer 190 includes a plurality of touch control electrodes which can use the touch control electrode structure in accordance with any of the first to tenth embodiments as disclosed above regarding FIGS. 1-13. The touch control structure 170 can be adhered to the display panel 160 via glue. The display panel 160 can be a liquid crystal display (LCD) panel or a self-illumination display panel such as an organic light emitting diode (OLED) display panel.

Figure 15:
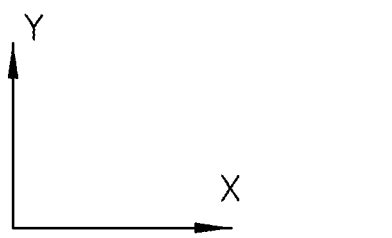
FIG. 15 is a diagrammatic view of a pixel structure of a display panel of the touch control device of FIG. 14.
Figure 15:
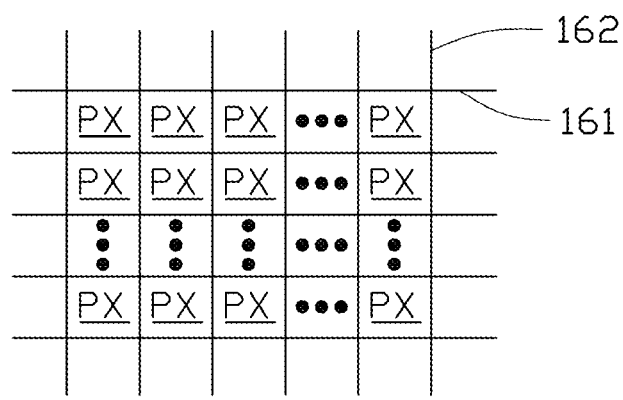

FIG. 15 illustrates a diagram of a pixel structure of the display panel 160 of the touch control device 150 of FIG. 14. The display panel 160 includes first driving lines 161 such as scanning lines extending along the first direction X, and second driving lines 162 such as data lines extending along the second direction Y. A plurality of pixel regions PX which are arranged in a rectangular array, is defined between the first and second driving lines 161, 162. Each pixel region PX is substantially rectangular.

Figure 16:
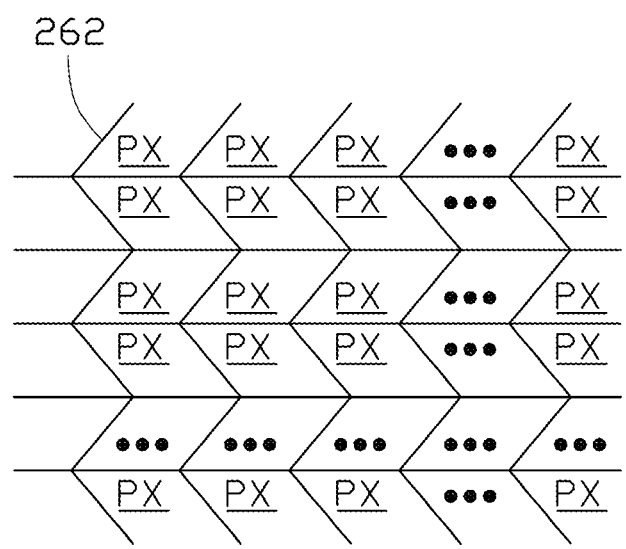
FIG. 16 is a diagrammatic view of a pixel structure of a display panel of the touch control device of FIG. 14, in accordance with an alternative embodiment.

FIG. 16 illustrates a pixel structure of the display panel 160 of the touch control device 150 of FIG. 14 in accordance with an alternative embodiment. The pixel structure of FIG. 16 is substantially the same as the pixel structure of FIG. 15. The difference is that the second driving lines (i.e., data lines) 262 are zigzag, whereby each pixel region PX has a shape of a parallelogram.

Figure 17:
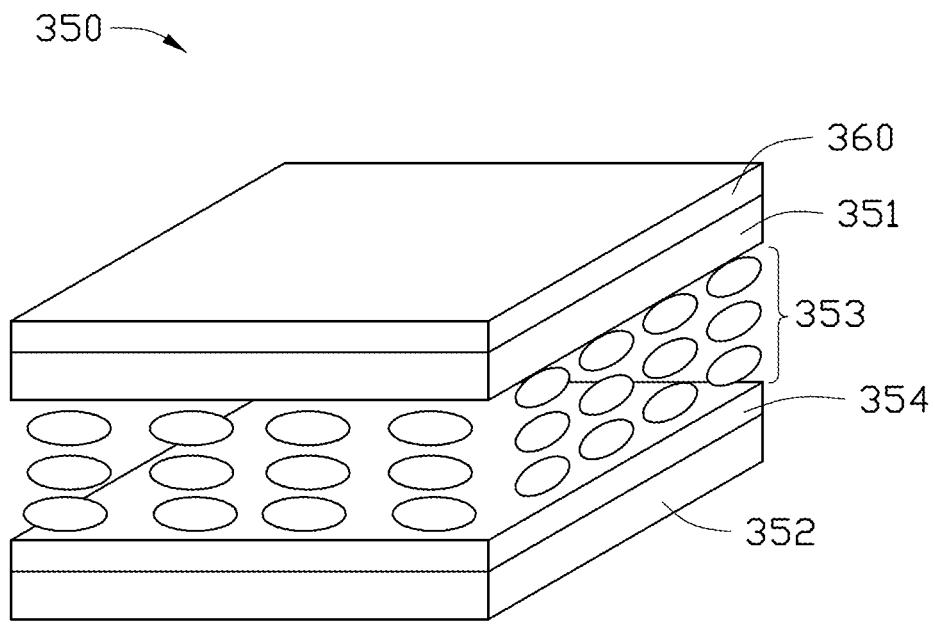
FIG. 17 is an isometric view of a touch control device in accordance with a twelfth embodiment of the present disclosure.

FIG. 17 illustrates an isometric view of a structure of a touch control device 350 in accordance with a twelfth embodiment of the present disclosure. The touch control device 350 includes a first substrate 351, a second substrate 352, a display medium layer 353, such as liquid crystal layer, between the first and second substrates 351, 352, and a touch control electrode layer 360 over the first substrate 351. The first substrate 351 can be a color filtering plate while the second substrate 352 can be a thin film transistor (TFT) plate. The thin film transistor plate can include a TFT driving circuit layer 354 thereover. The TFT driving circuit layer 354 can include the first and second driving lines 161, 162 (262) shown in FIG. 15 or FIG. 16. The touch control electrode layer 360 can be directly formed on the first substrate 351, and includes a plurality of touch control electrodes. The touch control electrodes can use the touch control electrode structure in accordance with any of the first to tenth embodiments as disclosed above regarding FIGS. 1-13.

Figure 18:
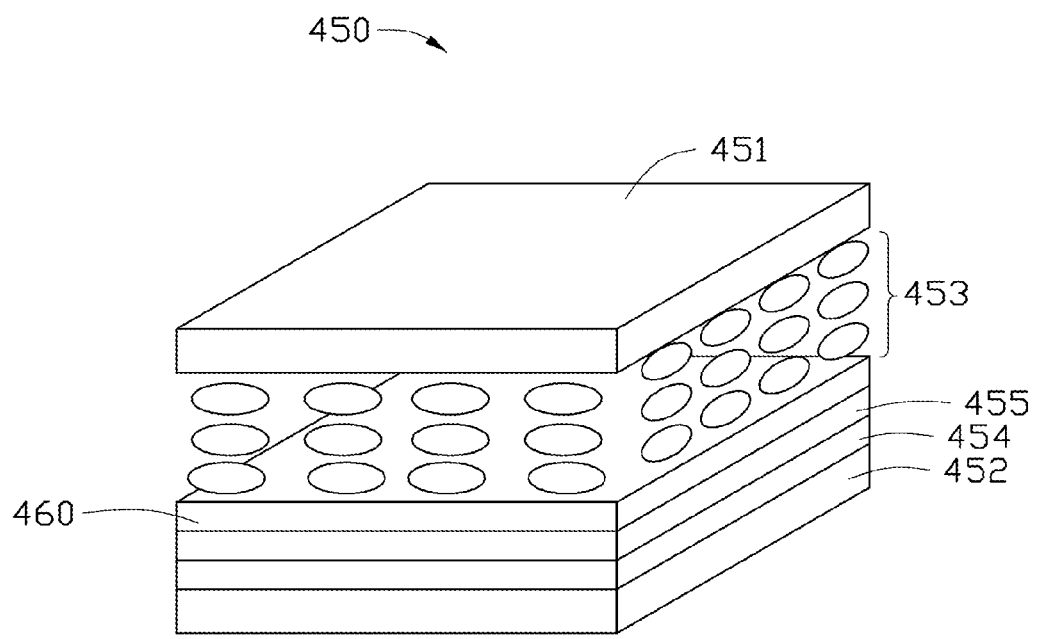
FIG. 18 is an isometric view of a touch control device in accordance with a thirteenth embodiment of the present disclosure.

FIG. 18 illustrates an isometric view of a structure of a touch control device 450 in accordance with a thirteenth embodiment of the present disclosure. The touch control device 450 includes a first substrate 451, a second substrate 452, a display medium layer 453, such as liquid crystal layer, between the first and second substrates 451, 452, and a touch control electrode layer 460 between the display medium layer 453 and second substrate 452. The first substrate 451 can be a color filtering plate while the second substrate 452 can be a thin film transistor (TFT) plate. The thin film transistor plate 452 can include a TFT driving circuit layer 454 thereover. The TFT driving circuit layer 454 can include the first and second driving lines 161, 162 (262) shown in FIG. 15 or FIG. 16. An electrically insulating layer 455 is provided over the TFT driving circuit layer 454. The touch control electrode layer 460 is sandwiched between the display medium layer 453 and the electrically insulating layer 455, and includes a plurality of touch control electrodes. The touch control electrodes can use the touch control electrode structure in accordance with any of the first to tenth embodiments as disclosed above regarding FIGS. 1-13.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. A touch control device comprising:
   a touch control circuitry;
   a plurality of touch control electrodes coupled to the touch control circuitry and each of the plurality of touch control electrodes comprising a plurality of micro electrodes and a plurality of coupling lines electrically coupling the micro electrodes together; and
   a plurality of electrically conductive lines electrically coupling the touch control circuitry and each of the plurality of touch control electrodes;
   wherein each of the plurality of micro electrodes has a first length along a first direction and a second length along a second direction perpendicular to the first direction, the first and second lengths each being less than 80 micrometers;
   wherein the first and second lengths each are not smaller than 50 micrometers;
   wherein the micro electrodes are divided into first micro electrodes and second micro electrodes, the first and second micro electrodes are symmetrical to an axis therebetween, the axis extends along the first direction;
   wherein each micro electrode has a shape of a parallelogram;
   wherein each touch control electrode further comprises a plurality of dummy electrodes interposed between the micro electrodes thereof, the dummy electrodes are electrically insulating from the micro electrodes and the coupling lines, each dummy electrode has a shape and dimension substantially the same as a shape and dimension of a neighboring micro electrode.

2. The touch control device of claim 1, wherein the micro electrodes and the coupling lines are made of transparent, electrically conductive material.

3. The touch control device of claim 1, wherein the micro electrodes are made of transparent, electrically conductive material, and the coupling lines are made of silver paste including nano silver particles.

4. The touch control device of claim 1, wherein each micro electrode comprises a plurality of substantially triangular sub-micro electrodes combined together.

5. The touch control device of claim 1, wherein each micro electrode defines at least an opening therein.

6. The touch control device of claim 1, wherein two opposite sides of each micro electrode which are extended along the first direction are serrated.

7. The touch control device of claim 1, wherein each micro electrode has opposite first and second sides inclined relative to the first direction and opposite third and fourth sides parallel to the first direction, an angle being defined between the first side and the first direction, wherein the angle is between 30 and 60 degrees.

8. The touch control device of claim 7, wherein the angle is 45 degrees.

9. The touch control device of claim 1, wherein the touch control electrodes are arranged into first touch control conductive lines and second touch control conductive lines perpendicularly intersecting the first touch control conductive lines, at the intersecting places, the micro electrodes of the touch control electrodes of the first touch control conductive lines overlapping the dummy electrodes of the touch control electrodes of the second touch control conductive lines.

10. The touch control device of claim 1, further comprising a plurality of electrically conductive stripes, wherein the touch control electrodes are arranged into a plurality of first touch control conductive lines, the electrically conductive stripes are arranged into a plurality of second touch control conductive lines perpendicularly intersecting the first touch control conductive lines and overlapping the coupling lines of the touch control electrodes.

11. The touch control device of claim 1, further comprising a plurality of dummy electrodes located between two neighboring touch control electrodes along the first direction.

12. The touch control device of claim 1, further comprising a display panel and a substrate over the display panel, the touch control electrodes and the electrically conductive lines being formed on the substrate.

13. The touch control device of claim 12, wherein the display panel includes a plurality of scanning lines, a plurality of data lines intersecting the scanning lines, and a plurality of pixel regions between the scanning and data lines.

14. The touch control device of claim 13, wherein the data lines are zigzag.

15. The touch control device of claim 13, wherein the display panel comprises a second substrate and a thin film transistor (TFT) driving layer on the second substrate, the TFT driving layer comprising the scanning lines, the data lines and the pixel regions, the display panel further comprising a display medium layer located between the TFT driving layer and the substrate.

16. The touch control device of claim 1, further comprising a first substrate and a second substrate, a TFT driving layer over the second substrate, an electrically insulating layer over the TFT driving layer, a display medium layer located between the first substrate and the electrically insulating layer, the touch control electrodes and the electrically conductive lines being formed on the electrically insulating layer.

17. A touch control device comprising:
    a plurality of touch control electrodes, each of the plurality of touch control electrodes comprising a plurality of micro electrodes and a plurality of coupling lines electrically coupling the micro electrodes together; and
    wherein each of the plurality of micro electrodes has a first length along a first direction and a second length along a second direction perpendicular to the first direction, the first and second lengths each being less than 80 micrometers;
    wherein each of the plurality of touch control electrodes further comprises a plurality of dummy electrodes interposed between the micro electrodes thereof, the dummy electrodes are electrically insulating from the micro electrodes and the coupling lines, each dummy electrode has a shape and dimension substantially the same as a shape and dimension of a neighboring micro electrode.

18. A touch control device comprising:
    a plurality of touch control electrodes, each of the plurality of touch control electrodes comprising a plurality of micro electrodes and a plurality of coupling lines electrically coupling the micro electrodes together; and
    wherein each of the plurality of micro electrodes has a first length along a first direction and a second length along a second direction perpendicular to the first direction, the first and second lengths each being less than 80 micrometers;
wherein the plurality of micro electrodes are divided into first micro electrodes and second micro electrodes; each of the plurality of touch control electrodes comprises at least one first micro electrode and at least one second micro electrode; the at least one first micro electrode and at least one second micro electrode in each of the plurality of touch control electrodes are electrically coupled and symmetrical to one coupling line extending along the first direction.

\* \* \* \* \*